Dec. 28, 1926.
J. P. HEIL ET AL
1,612,433
EMERGENCY VALVE AND CONTROLLING MEANS THEREFOR
Filed Feb. 9, 1923   3 Sheets-Sheet 1
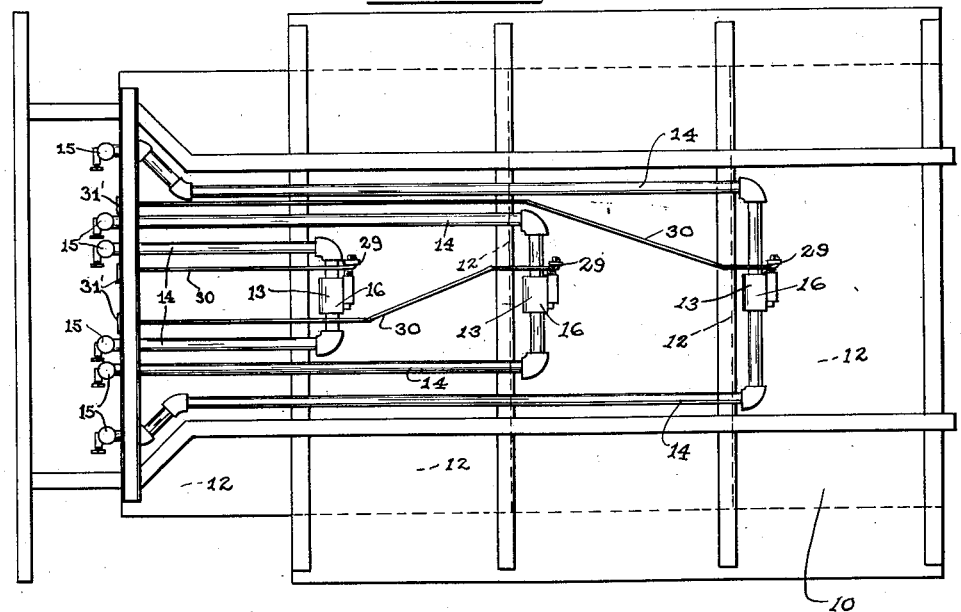
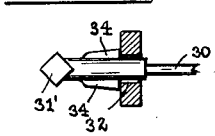
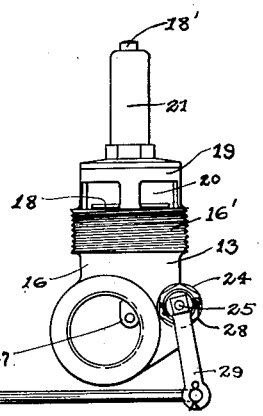
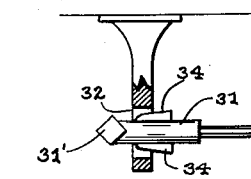
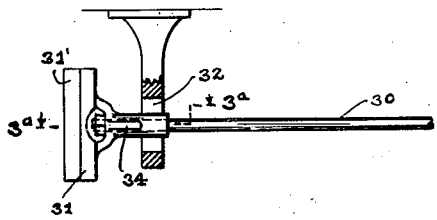
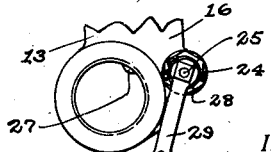
INVENTOR.
BY
ATTORNEYS.

Dec. 28, 1926.

J. P. HEIL ET AL 1,612,433

EMERGENCY VALVE AND CONTROLLING MEANS THEREFOR

Filed Feb. 9, 1923  3 Sheets-Sheet 2

INVENTOR.
Julius P. Heil 2nd
BY Arthur Borchardt,
Morsell, Keeney & Morsell,
ATTORNEYS.

Patented Dec. 28, 1926.

1,612,433

UNITED STATES PATENT OFFICE.

JULIUS P. HEIL AND ARTHUR BORCHARDT, OF MILWAUKEE, WISCONSIN.

EMERGENCY VALVE AND CONTROLLING MEANS THEREFOR.

Application filed February 9, 1923. Serial No. 618,167.

This invention relates to improvements in emergency valves and actuating means therefor more particularly adapted for use with truck tanks for dispensing gasoline, oils, etc. Truck tanks for dispensing gasoline, oils, etc. are usually divided into compartments for holding fluids of different kinds or qualities and the compartments are provided with discharge pipes which extend to the rear portion of the truck and have faucets for controlling the flow therethrough. As thus constructed the faucets are apt to become damaged and the entire contents of the tank will be discharged from the tank and lost. Furthermore by the necessary positioning of the faucets at the rear end of the truck at the point of delivery of the fluid, the faucets are more apt to be injured by the operators in dispensing the liquid, and if injured in any manner the contents of the tank are liable to be lost.

It is one of the objects of the present invention to overcome the before mentioned objectionable features and provide an emergency valve and controlling means therefor which will control the flow to the faucets and which normally is in closed position and has to be opened to draw the fluid from the tank.

A further object of the invention is to provide an emergency valve which is located within the tank and opens against the pressure of the flow.

A further object of the invention is to provide an emergency valve which will prevent the loss of gasoline through collision or fire resulting therefrom as gasoline cannot leak from the tank into the street. Furthermore, the construction prevents tampering with the tank or the accidental or otherwise opening of the faucets and the loss of fluid from the tank.

A further object of the invention is to provide an emergency valve and controlling means therefor which while normally in a closed position is adapted to be easily opened and closed from the rear portion of the truck.

A further object of the invention is to provide an emergency valve and controlling means therefor which is of simple construction, is strong and durable and is well adapted for the purpose described.

With the above and other objects in view the invention consists of the improved emergency valve and controlling means therefor and its parts and combinations as set forth in the claims and all equivalents thereof.

In the accompanying drawings in which the same reference characters indicate the same parts in all of the views:

Fig. 1 is an inverted view of a truck tank provided with the improved emergency valves and controlling means therefor;

Fig. 2 is a side view in closed position of an emergency valve and the controlling means therefor, a part being shown in section;

Fig. 3 is a similar view with the valve in open position;

Figure 4:
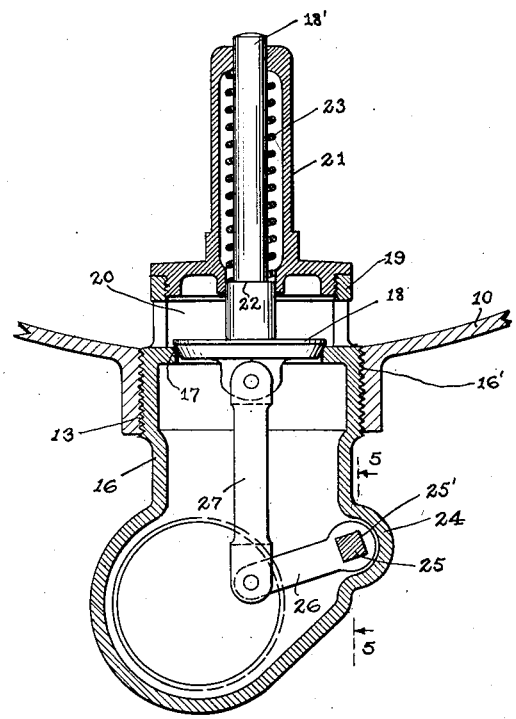
Figure 5:
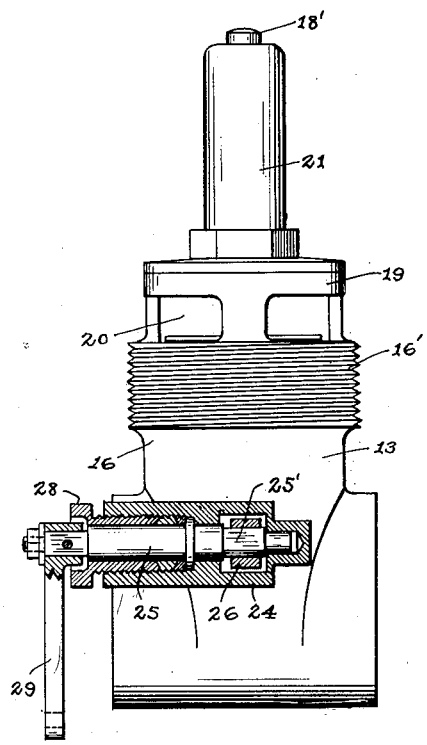
Figure 6:
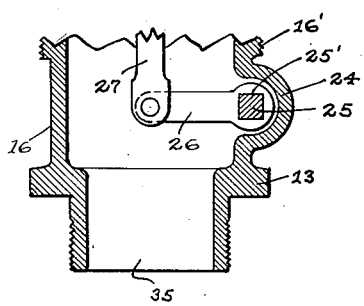
Figure 7:
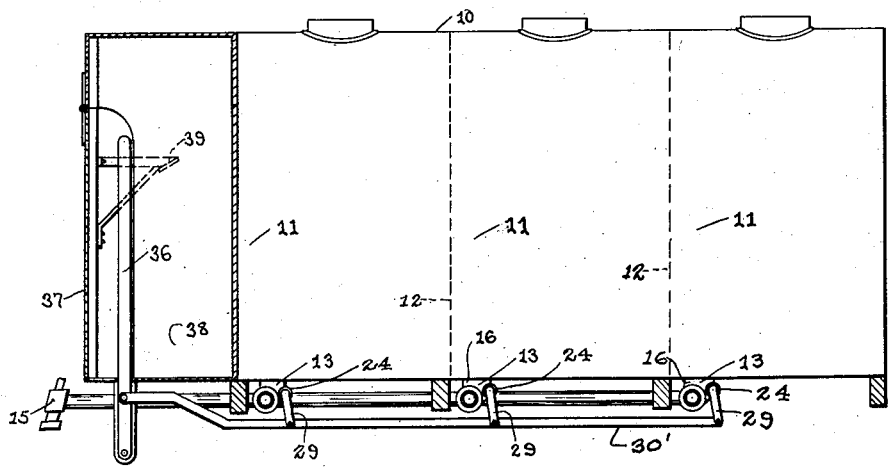
Figure 8:
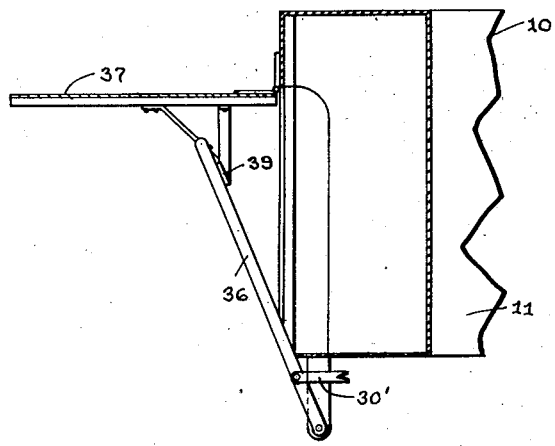

Fig. 3ª is a sectional detail view taken on line 3ª 3ª of Fig. 3;

Fig. 4 is a vertical sectional view of the valve on a larger scale, the view also showing a portion of the casing;

Fig. 5 is a vertical sectional view of the valve taken on line 5—5 of Fig. 4;

Fig. 6 is a vertical sectional detail view of a modified form of valve;

Fig. 7 is a side view partly in section of a modified form of actuating means for the valve shown in closed position; and Fig. 8 is a similar view showing the parts in open position.

Referring to the drawings the numeral 10 indicates the bottom portion of a truck tank which is usually divided into compartments 11 by partitions 12. One of the improved emergency valves 13 is mounted in the lower portion of each compartment and is usually provided with branch pipes 14 which extend to the rear end portion of the trunk. Faucets 15 mounted on said rear end portions of said branch pipes control the flow of the gasoline, oils, etc., through said branch pipes when the emergency valves are opened.

Each valve comprises a casing 16 having a threaded portion 16' which threads into the bottom portion of the tank and a valve seat portion 17 which is closed by a stem valve 18. The casing is formed with an upward extension 19 having side openings 20, and a guide member 21 threaded into the upper open end of the extension has the stem 18' of the valve 18 extended and guided therethrough as shown in Fig. 4. The valve stem is formed with an annular shoulder 22 and a coiled spring 23 surrounding said valve stem and interposed between the stem shoulder and the upper end portion of the guide member yieldingly holds the valve in closed position. As thus positioned the valve opens against the pressure of the flow of the fluid from the tank and when the valve is in open position the fluid will flow through the side openings 20 and the valve casing and the branch tubes 14 and be discharged through the faucets 15.

The valve casing 16 is formed with a tubular side bearing portion 24 in which is journaled a short valve shaft 25 having an inner medial squared portion 25′ upon which is mounted the outer end portion of a valve arm 26. The inner end portion of said valve arm 26 is pivotally connected to the lower end portion of a connecting rod 27, the upper end portion of which is pivotally connected to the lower portion of the valve 18.

The outer end portion of the shaft 25 extends through a stuffing nut 28 and is squared to receive an arm 29 mounted thereon. Said arm 29 depends downwardly therefrom and at its lower end is pivotally connected to the inner end of an actuating rod 30 which extends horizontally towards the rear end of the truck. The rear or outer end of the rod is provided with a T-shaped handle 31 revolubly mounted thereon. Said handle extends slidably through an elongated opening or slot 32, formed in a bracket member 33 depending downwardly from the truck, and is provided with short upper and lower ribs 34 which permit movement of said handle through the elongated opening when the T-shaped portion 31′ of the handle is in horizontal position. When the handle is pulled outwardly against the spring tension of the valve to open said valve and the T-portion turned to a perpendicular position, the inner ends of the ribs 34 will bear against the side portion of the bracket and hold the valve in open position.

In the preferred form the valve casing is open on both sides to connect the branch pipes 14 thereto whereas in the modified form shown in Fig. 6 the opening 35 is in the bottom portion of said casing.

In the modified form shown in Figs. 7 and 8 a single rod 30′ is connected to all of the valve arms 29 and at its rear end is connected to the medial portion of an upwardly extending lever 36. The upper end of said lever extends adjacent the inner side of a door 37 closing a can compartment 38 at the rear end of the tank, and said door is provided with a bracket 39 which engages and pulls the lever outwardly to open the valves when the door is swung to open position. The closing movement of the door will permit the springs of the valves to swing the lever inwardly to closed position.

From the foregoing description it will be seen that the improved emergency valve and the controlling means therefor is of very simple construction and is well adapted for the purpose described.

What I claim as my invention is:

1. In combination with a tank having a discharge pipe closed by a faucet adjacent the lower rear end of the tank, of an emergency valve and controlling means therefor, comprising a casing extending into and connected to the tank and also connected to the pipe, an inwardly and upwardly opening valve closing the opening in said casing, a coiled spring holding the valve normally in closed position, a short shaft journaled in one side of the casing and having an arm within the casing which is linked to the valve, an arm on the outer end portion of the shaft, a horizontal rod connected to the last mentioned arm and extending to a point adjacent the faucet, and a handle connected to the outer end of the rod adjacent the faucet and having means for holding the rod in its outer position.

2. In combination with a tank having a discharge pipe adjacent its rear lower end closed by a faucet, of an emergency valve and controlling means therefor, comprising a casing extending upwardly into and connected to the tank and also connected to the pipe, an inwardly and upwardly opening valve closing the opening in said casing, a coiled spring holding the valve normally in closed position, a short shaft journaled in the casing and having an arm within the casing which is linked to the valve, an arm on the outer end portion of the shaft, a bracket adjacent the faucet and having an elongated opening, a horizontal rod connected to the last mentioned arm and extending towards the bracket, and a handle revolubly connected to the outer end of the rod and extending through the elongated opening and having a projecting rib which will pass through the opening while in one position but will lock the handle against return movement when turned in another position.

3. An emergency valve, comprising a casing having an outer threaded portion and a valve seat opening in its upper portion, an annular extension projecting upwardly from the threaded portion of the casing and having side openings, a guide member threaded to the upper portion of the extension and having a tubular portion projecting upwardly therefrom, said extension and guide member being of less diameter than the outer threaded portion of the casing, a valve closing the seat opening and having a stem which extends upwardly through and is guided in the tubular portion, a coiled spring surrounding the valve stem and positioned within the tubular portion for normally holding the valve in closed position, a shaft journaled in one side portion of the casing and having an arm on its inner end portion, a link connecting the arm to the valve, and an arm mounted on the outer end portion of the shaft.

4. In combination with a tank having a discharge pipe closed by a faucet adjacent the rear lower end of the tank, of an emergency valve and controlling means therefor, comprising a casing extending into and connected to the tank and also connected to the pipe, an inwardly and upwardly opening valve closing the opening in said casing, a coiled spring holding the valve normally in closed position, a short shaft journaled in one side of the casing and having an arm within the casing for moving the valve to open position, an arm on the outer end portion of the shaft, a horizontal rod connected to the last mentioned arm and extending to a point adjacent the faucet, and a handle connected to the outer end of the rod adjacent the faucet and having means for holding the rod in its outer position.

In testimony whereof, we affix our signatures.

JULIUS P. HEIL.
ARTHUR BORCHARDT.